United States Patent
Nitzpon et al.

(10) Patent No.: US 7,595,566 B2
(45) Date of Patent: Sep. 29, 2009

(54) METHOD FOR THE OPERATION OF A WIND ENERGY PLANT WITH A SYNCHRONOUS GENERATOR AND A SUPERIMPOSITION GEARBOX

(75) Inventors: Joachim Nitzpon, Hamburg (DE); Thomas Paul Woldmann, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 62 days.

(21) Appl. No.: 11/840,558

(22) Filed: Aug. 17, 2007

(65) Prior Publication Data
US 2008/0054642 A1    Mar. 6, 2008

(30) Foreign Application Priority Data
Aug. 31, 2006    (DE) .................. 10 2006 040 930

(51) Int. Cl.
*F03D 9/00* (2006.01)
(52) U.S. Cl. ........................... 290/55; 290/44
(58) Field of Classification Search .......... 290/44, 290/55; 416/132 B, 7; 60/398; 415/4.5, 415/2.1
See application file for complete search history.

(56) References Cited

U.S. PATENT DOCUMENTS

| | | | |
|---|---|---|---|
| 4,461,957 A * | 7/1984 | Jallen | 290/44 |
| 4,464,579 A * | 8/1984 | Schwarz | 290/44 |
| 4,613,760 A * | 9/1986 | Law | 290/1 C |
| 4,613,763 A * | 9/1986 | Swansen | 290/44 |
| 4,691,119 A * | 9/1987 | McCabria | 307/84 |
| 6,856,042 B1 * | 2/2005 | Kubota | 290/55 |
| 7,081,689 B2 * | 7/2006 | Tilscher et al. | 290/44 |
| 7,259,471 B2 * | 8/2007 | Basteck | 290/43 |
| 2005/0236838 A1 * | 10/2005 | Rosebrock et al. | 290/44 |
| 2007/0057515 A1 * | 3/2007 | Daniels | 290/44 |
| 2007/0216164 A1 * | 9/2007 | Rivas et al. | 290/44 |
| 2008/0106098 A1 * | 5/2008 | Miller et al. | 290/44 |

FOREIGN PATENT DOCUMENTS

| | | |
|---|---|---|
| DE | 1 283 359 A1 | 10/2001 |
| DE | 103 61 443 A1 | 7/2005 |
| DE | 103 57 292 A1 | 8/2005 |

OTHER PUBLICATIONS

Joe Kaiser, Electrical Power Motors, Controls, Generators, Transformers. The Goodheart-Willcox Company, Inc., pp. 59.*
Overview Article by P. Caselitz et al, "Drehzahlvariable Windkraftanlagen mit elektrisch geregeltem Uberlagerungsgetriebe",Konferenzband DEWEK 92, pp. 171-175. Statement of Relevancy attached.

\* cited by examiner

*Primary Examiner*—Julio Gonzalez R
(74) *Attorney, Agent, or Firm*—Vidas, Arrett & Steinkraus, P.A.

(57) ABSTRACT

A method for the operation of a wind energy plant, with a synchronous generator and a superimposition gearbox, which is connected between rotor and generator, and the gear ratio of which is adjusted by a control unit, characterised in that a mode of operation is provided in which the generator is connected to the electric grid, and the generator shaft is uncoupled from the rotor shaft via the superimposition gearbox.

11 Claims, 2 Drawing Sheets

METHOD FOR THE OPERATION OF A WIND ENERGY PLANT WITH A SYNCHRONOUS GENERATOR AND A SUPERIMPOSITION GEARBOX

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the operation of a wind energy plant with a synchronous generator and a superimposition gearbox.

From an overview article "Drehzahlvariable Windkraftanlagen mit elektrisch geregeltem Überlagerungsgetriebe" by P. Caselitz et al., Konferenzband "DEWEK '92", p. 171-175, the entire contents of which is incorporated herein by reference, the use of electrically controlled superimposition gearboxes for the rotational speed variable operation of wind energy plants is put forward. Caselitz et al. point out that in this conception, the rotational speed variability is not realised in the electric part, but in the mechanical part of the plant. For this purpose, a superimposition gearbox is provided which has a third shaft, by which the gear ratio between rotor and generator can be varied on the wind energy plant. The relation between the rotational speeds of the three shafts can be summarised as follows:

$$i_1 \omega_R - i_2 \omega_C - \omega_G = 0,$$

wherein $i_1$ and $i_2$ are gear ratios predetermined by the construction and $\omega_R$ designates the rotational speed of the rotor, $\omega_C$ the rotational speed on the third shaft of the superimposition gearbox and $\omega_G$ the generator rotational speed. For driving the third shaft of the superimposition gearbox, an electric drive is normally used. The use of a power converter fed asynchronous machine with squirrel-cage armature is proposed by Caselitz et al.

From the equation at hand it is directly obvious that at connected generator with constant rotational speed $\omega_G$ a variable rotor velocity $\omega_R$ (t), through changing wind conditions and other boundary conditions for instance, can be compensated by an adaptation of the rotational speed at the third shaft, wherein here, a torque is guided to the generator via the third shaft or is guided from the rotor into the third shaft.

From DE 103 61 443 B4, the entire contents of which is incorporated herein by reference, a wind energy plant is known which has a rotational speed constant, grid-coupled generator. A controller with three controlling levels is provided in order to control the wind energy plant in the partial load region. In the first controlling level, the input shaft of a power-branching gearbox is driven by the wind rotor. In one power branch, a hydrodynamic speed transformer with guide wheel and guide vanes is provided. Further, a reaction member is provided in one power branch, which causes a power reflux to the power-branching gearbox via the other power branch. An improved control in a wind energy plant with a superimposition gearbox is said to be the advantages of this realisation of a wind energy plant.

From DE 103 57 292 B4, the entire contents of which is incorporated herein by reference, a method for controlling a drive train of a wind energy plant with rotational speed guiding is known, wherein the rotational speed guiding takes place via a power-branching gearbox and a hydrodynamic speed transformer with variable-pitch guide vanes. The speed transformer with variable-pitch guide vanes comprises a pump wheel, a turbine wheel and an adjustable reaction member, and thus it permits rotational speed guided control of the wind energy plant at constant rotational speed for the electric generator.

From EP 1 283 359 A1, the entire contents of which is incorporated herein by reference, a wind energy plant with a superimposition gearbox is known. The controlling shaft for the adjustment of the gear ratio on the superimposition gearbox is driven by an electric machine, in order to keep a rotational speed at the generator constant or within a certain range. For this purpose, the electric machine can be driven as a generator and as a motor as well.

The present invention is based on the objective to provide a method for the operation of a wind energy plant, which permits a high degree of grid compatibility and grid availability by simple means.

BRIEF SUMMARY OF THE INVENTION

The method of the present invention serves for the operation of a wind energy plant, which is equipped with a superimposition gearbox and a synchronous generator. The gear ratio between rotor and generator is adjusted by a control unit on the superimposition gearbox. The control unit has preferably an electric drive in order to provide the needed torque or the necessary rotational speed on the superimposition gearbox. But also other control units, like hydrodynamic or hydrostatical control units can be provided. According to the present invention, a mode of operation is provided for the control unit in which the generator is connected to the electric grid and is uncoupled from the rotor via the superimposition gearbox. For the uncoupled rotor, the rotational speed can be deliberately selected depending on the wind and other conditions. For instance, the rotor may also be stopped. Thus, the superimposition gearbox is not only used in order to compensate rotational speed variations on the rotor, but also in order to operate the generator completely independently from the rotor. In this mode of operation, the connection of the synchronous generator is avoided, which is often accompanied by troubles of the electric grid. When the wind velocity increases again after a separation of the rotor from the generator, the rotor can be connected again via the superimposition gearbox, without that the generator has to be newly connected to the grid.

In the method of the present invention, a synchronous generator which is excited by an excitation unit is preferably provided. The synchronous generator permits the reactive power portion supplied into the grid to be regulated or set through a control of its excitation.

In a preferred embodiment, the mode of operation of the present invention is used in order to be operated as a phase shifter for the grid. In doing so, the synchronous generator can be driven to take up reactive power from the grid or to supply reactive power into the grid. Through this, it is possible to stabilise electric supply grids. A particular advantage is that grid stabilisation can take place independently from the actual wind velocity, because the rotor can be uncoupled from the generator by the superimposition gearbox.

In a preferred embodiment of the method of the present invention, it is provided that when falling below a predetermined value for the wind velocity or for the electric power generated by the generator, the rotor is mechanically uncoupled from the generator via the superimposition gearbox, and the synchronous generator remains electrically coupled to the grid. Through this mode of operation, too frequent coupling on and off the generator to the grid or from the grid, respectively, is avoided, so that only rarely switching-caused interfering impulses from the synchronous generator occur in the grid.

In an also preferred embodiment, the rotor is uncoupled from the generator shaft via the superimposition gearbox in reaction to a signal, and reactive power generated by the generator is supplied into the grid. The signal can be preset by an external electric utility or be generated by a park control device for plural wind energy plants. Also, it may be provided that a park control or an individual control generates the signal, when there is a too strong deviation from reference values for current, voltage and/or phase at the grid connection point.

In an also practical embodiment, an additional electric engine is provided, which is preferably couplable to a generator.

BRIEF DESCRIPTION OF THE SEVERAL VIEWS OF THE DRAWINGS

The method of the present invention will be explained in more detail by means of examples in the following.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
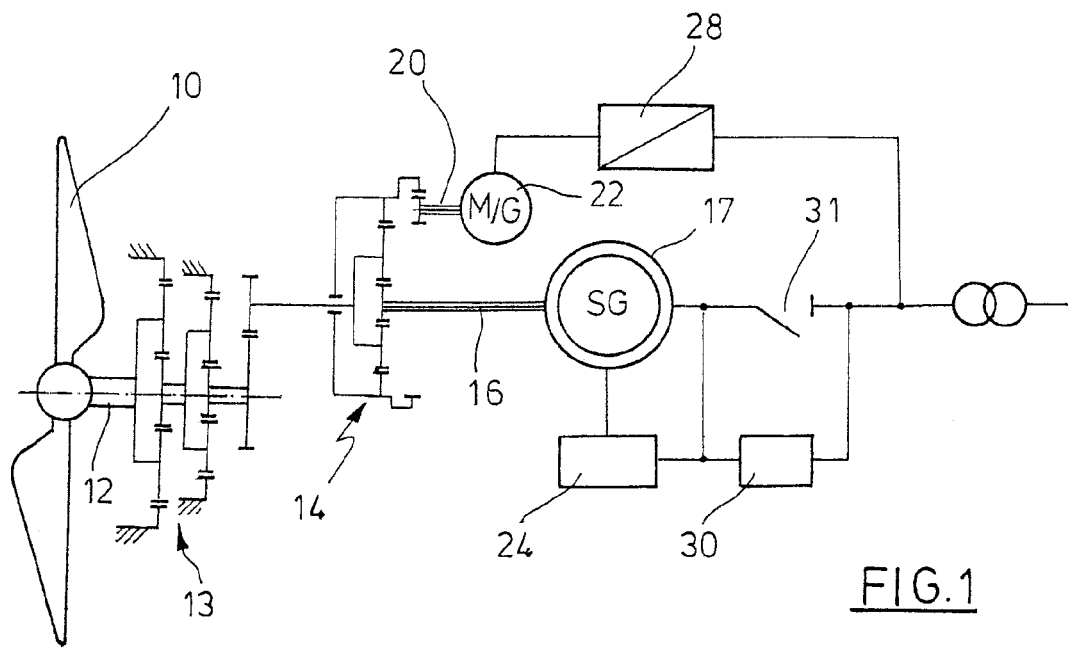
FIG. 1 shows a schematic view of the drive train of a wind energy plant, with a superimposition gearbox and an electric drive for the controlling shaft.

Schematically represented, FIG. 1 shows a rotor 10, which transforms the forces from the wind partially into a torque. Via its rotor shaft 12, the torque of the rotor 10 is forwarded to a main gearbox 13 and a superimposition gearbox 14. The superimposition gearbox 14 has a driven shaft 16, which is coupled to a synchronous generator 17. The third shaft 20 of the superimposition gearbox 14 is coupled with a motor 22. With respect to the flow of the torques, we have that the torque of the driven shaft 16 applied to the generator is composed from the torque flowing into the superimposition gearbox 14, which corresponds to the torque on the driven shaft of the main gearbox and the rotor shaft 12, and the torque of the motor 22 additionally introduced via the third shaft 20, or, in a special case, the torque taken out of the superimposition gearbox 14 via the shaft 20. In the latter realisation, the torque entering the superimposition gearbox is subdivided.

As a generator 17, a synchronous generator is provided, which is connected to an excitation unit 24. Not represented, but possible however, is to provide a direct current intermediate circuit, via which the generated power flows into the grid.

The motor 22 as well as the excitation unit 24 are controlled by a central control unit, which drives a current converter 28 for the motor 22, for instance, in order to apply the corresponding moment to the superimposition gearbox 14 via the third shaft. Even the excitation unit 24 for the synchronous generator is driven by the control unit. An electric utility, not shown in the figure, can preset corresponding control signals to the control unit.

In the method of the present invention, the generator 17 remains on the grid and is synchronised with the same. Before connecting via the contactor 31, a synchronisation unit 30 checks whether the synchronisation conditions, for voltage and phase for instance, comply on the generator side with the corresponding values on the grid side. The rotor 10 is uncoupled from the generator shaft 16 via the superimposition gearbox 14, the main gearbox 13 being connected there between in the shown example. Thus, the rotational speed of the rotor 10 can be reduced. The power loss required for the operation of the generator on the grid is directly taken out of the grid, wherein the generator 17 is adjusted via the excitation unit 24 to supply reactive power into the grid or to take out reactive power from the grid. For instance, when there is a grid breakdown, as a result, the wind energy plant can support the grid even at very weak wind conditions by providing reactive power. In the method of the present invention, the synchronous generator brought to the grid remains connected to the grid for the present and works synchronously to the grid.

Figure 2:
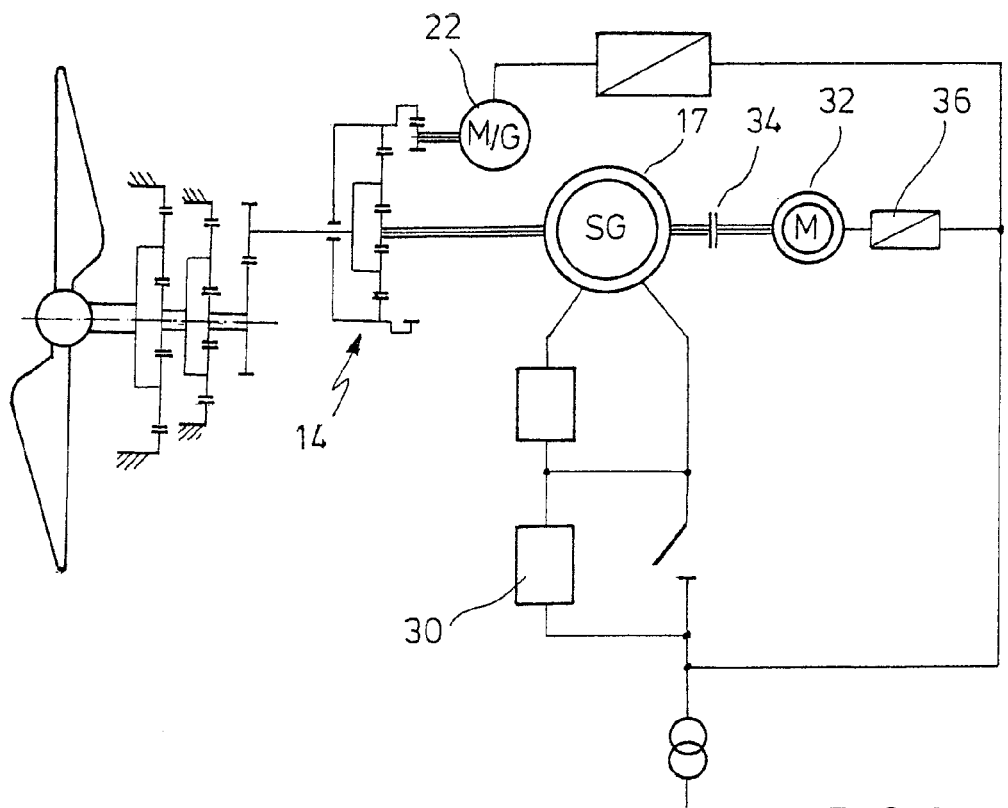
FIG. 2 shows a schematic view of the wind energy plant of FIG. 1, with an additional electromotoric drive for running up the generator.

FIG. 2 shows a similarly constructed drive train for the wind energy plant. In this, a further motor 32 is additionally provided, which is coupled to the generator 17 via a clutch 34. In the regular operation, the motor 32 is uncoupled from the generator and is coupled in only when running up the generator 17, in order to generate the rotational speed necessary for connecting on the generator 17. When the generator is connected through the synchronisation unit 30, the necessary power for the generator 17 can be provided otherwise, for instance taken out of the grid. The converter 36 drives the motor 32 in order to obtain the rotational speed necessary for the synchronisation.

Figure 3:
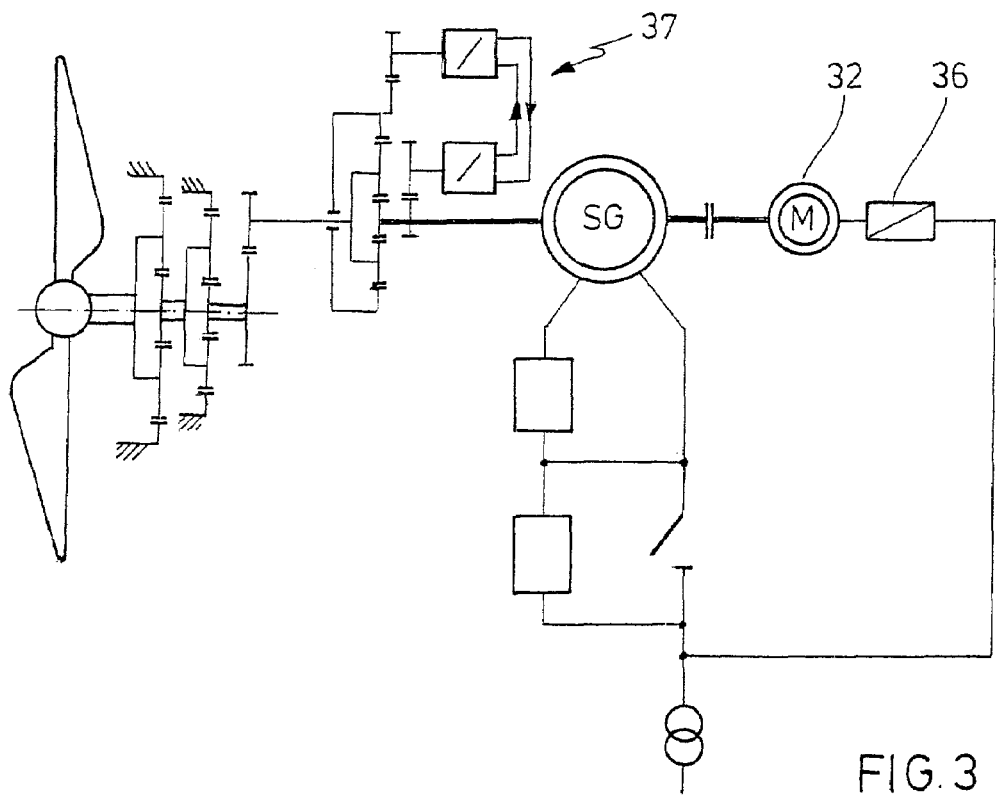
FIG. 3 shows a schematic view of a drive train with superimposition gearbox, wherein the controlling shaft is connected to the generator shaft via a hydrostatic control unit.
Figure 4:
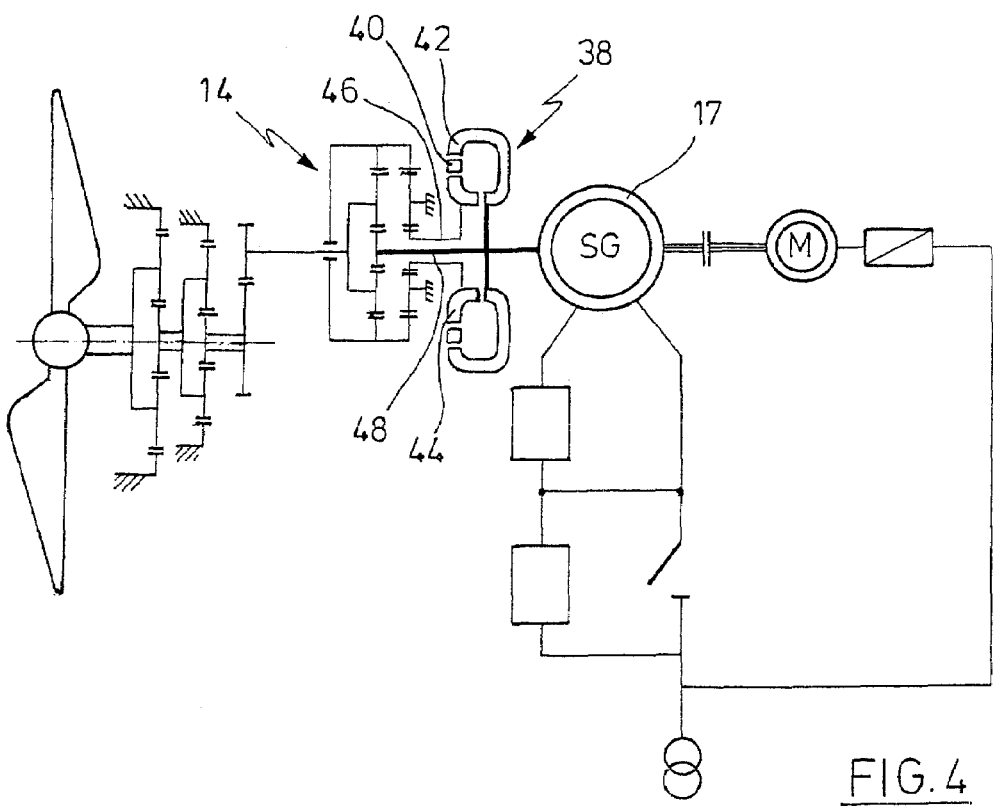
FIG. 4 shows the drive train from FIG. 3 with a hydrodynamic control unit.

FIGS. 3 and 4 show the drive train according to FIG. 2 with the variation that the motor 22 on the superimposition gearbox is replaced by an adjustable torque converter 38 or a hydrostat 37. The torque converter 38 has a guide wheel 40, which provokes a conversion of the rotational speed and/or the torque through its adjustment. Besides to the guide wheel, the converter 38 consists of a pump wheel 42, which is coupled to the driven shaft 48, and a turbine wheel 44, which is connected to the controlling shaft 46. For the transmission of the torque between the driven shaft of the superimposition gearbox and the controlling shaft 46 thereof, the torque converter 38 is filled with oil. For the uncoupling between the driven shaft 48 and the rotor shaft, the oil is removed from the torque converter. In the hydrostats from FIG. 3, the pumps are adjusted for uncoupling such that the same run along without load and do not transfer any torque. In the realisation example shown in FIG. 4, the controlling shaft via which the gear ratio of the superimposition gearbox is adjusted is realised as a hollow shaft 46, through which extends the driven shaft 48 of the superimposition gearbox.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind energy plant with a synchronous generator (17) and a superimposition gearbox (14), which is connected between rotor (10) and generator (17), and the gear ratio of which is adjusted by a control unit, characterised in that a mode of operation is provided in which the generator (17) is connected to the electric grid, and the generator shaft (16) is uncoupled from the rotor shaft (10, 12) via the superimposition gearbox (14) further characterised in that the synchronous generator (17) is operated as a phase shifter for the grid.

2. A method according to claim 1, characterised in that the synchronous generator (17) is separately excited by an excitation unit (24).

3. A method according to claim 2, characterised in that the synchronous generator is driven as a phase shifter by the excitation unit in order to take up reactive power from the grid.

4. A method according to claim 2, characterised in that the synchronous generator is driven as a phase shifter by the excitation unit in order to supply reactive power into the grid.

5. A method according to claim 1, characterised in that when falling below a predetermined value for the wind velocity or for the electric generator power, the rotor is uncoupled from the generator via the superimposition gearbox, and the synchronous generator remains coupled to the grid.

6. A method according to claim 1, characterised in that in reaction to a signal, the rotor is uncoupled from the generator shaft (16) via the superimposition gearbox (14) and reactive power is supplied into the grid.

7. A method according to claim 6, characterised in that the signal is a signal externally preset by an electric utility or by a control device for a wind park.

8. A method according to claim 1, characterised in that the control unit adjusts and/or regulates the gear ratio between rotor shaft and generator shaft hydrostatically or hydrodynamically.

9. A method according to claim 1, characterised in that the control unit has an electric drive in order to adjust and/or regulate the gear ratio between rotor shaft and motor shaft.

10. A method according to claim 1, characterised in that an electric machine (32), coupled to the generator, is provided in addition to the control unit.

11. A method according to claim 10, characterised in that the electric machine is couplably connected to the generator.

* * * * *